United States Patent [19]
Beckman et al.

[11] Patent Number: 5,783,013
[45] Date of Patent: Jul. 21, 1998

[54] METHOD FOR PERFORMING RESIN INJECTED PULTRUSION EMPLOYING MULTIPLE RESINS

[75] Inventors: Jay J. Beckman; James V. Gauchel, both of Newark, Ohio

[73] Assignee: Owens-Corning Fiberglas Technology Inc., Summit, Ill.

[21] Appl. No.: 478,131

[22] Filed: Jun. 7, 1995

[51] Int. Cl.$^6$ ..................... B29C 70/52
[52] U.S. Cl. ............ 156/180; 156/166; 156/433; 156/441; 264/136; 264/137; 425/112; 425/114
[58] Field of Search ............ 156/166, 180, 156/242, 245, 433, 441; 264/136, 137; 425/112, 114

[56] References Cited

U.S. PATENT DOCUMENTS

| | | |
|---|---|---|
| 3,033,729 | 5/1962 | Shobert . |
| 3,244,784 | 4/1966 | Boggs ..................... 156/441 X |
| 3,448,489 | 6/1969 | Boggs . |
| 3,684,622 | 8/1972 | Goldsworthy ............ 156/379.8 X |
| 3,895,896 | 7/1975 | White et al. ............... 264/137 X |
| 4,681,722 | 7/1987 | Carter et al. ............... 156/180 X |
| 5,105,596 | 4/1992 | Wertitsch et al. . |
| 5,225,020 | 7/1993 | Millett et al. ............... 156/180 |
| 5,322,582 | 6/1994 | Davies et al. ............... 156/180 |

FOREIGN PATENT DOCUMENTS

| | | |
|---|---|---|
| 0233171 | 1/1987 | European Pat. Off. . |
| 1539577 | 9/1968 | France . |
| 2103811 | 4/1972 | France . |
| 1704787 | 7/1971 | Germany . |
| 1361031 | 7/1974 | United Kingdom . |
| 2259044 | 3/1993 | United Kingdom . |

OTHER PUBLICATIONS

Gabriele, Michael, "Pultrusion's Promise," Plastics Technology, Mar. 1995, pp. 36–40.

*Primary Examiner*—Jeff H. Aftergut
*Attorney, Agent, or Firm*—C. Michael Gegenheimer; Inger H. Eckert

[57] ABSTRACT

A method for performing resin injected pultrusion employing different resin materials is provided. The method comprises impregnating the interior layers of a pultrusion reinforcement pack with a first resin material, adding the exterior layers to form a pultrusion pack and impregnating the pack with a resin material substantially nonidentical to the first resin material.

19 Claims, 4 Drawing Sheets

METHOD FOR PERFORMING RESIN INJECTED PULTRUSION EMPLOYING MULTIPLE RESINS

BACKGROUND OF THE INVENTION

The present invention relates in general to resin injected pultrusion and, more particularly, to a method for performing resin injected pultrusion employing multiple resins.

Pultrusion of resin impregnated fibers, such as mineral or glass fibers, is well known. Generally, pultrusion of resin impregnated fibers involves impregnating a multitude of continuous fibers and/or continuous fiber/mat combinations with a suitable resin material and passing the impregnated fibers through a die. Traditionally, the continuous fibers were impregnated by passing the fibers through a bath of liquid resin material, thereby completely wetting or coating the fibers in the resin material. The coated fibers were then consolidated and passed through a pultrusion or cure die where the fibers were formed into a desired shaped and the resin material cured to fix the fibers in place.

However, the resin baths of these prior art processes have several significant drawbacks. Resin baths, as operated in the prior art, resulted in an undue amount of waste in resin material thereby increasing operating expenses. Further, as tanks were employed to hold the resin materials, a large quantity of both time and expense were required to change from one particular resin material to a different type of resin material. In addition, resin materials, for the most part, comprise blends of organic compounds, a significant portion of which are volatile organic compounds or VOC's. The emission of VOC's is strictly monitored and limited by the various governmental agencies and regulations. Compliance with the regulations can become quite expensive. Resins baths, as employed in the prior art impregnation processes, are open or partially open to the atmosphere and involve the use of large quantities of resin materials. The level of VOC emissions in these prior art processes is much larger than desired.

As a result of the drawbacks of the use of a resin bath to impregnate continuous fibers, resin injection as a means for impregnating continuous fibers in a pultrusion process has been utilized for a number of years. The process consists of replacing the resin bath and any wet preform stations that may be employed with a machined cavity in a die. As dry fiber is fed through the die and into the cavity, resin is injected such that the fibers are coated with resin material.

Traditionally, prior art pultrusion processes have impregnated reinforcement packs with a single resin material. It would be desirable, however, to selectively impregnate one or more first reinforcement pack layers with a first resin, combine those impregnated first layers with second layers and impregnate the reinforcement pack with a second resin material.

SUMMARY OF THE INVENTION

This need is met by the present invention wherein a method and apparatus is provided for selectively impregnating one or more first reinforcement pack layers with a first resin material, combining those first layers with second layers and impregnating the reinforcement pack with a second resin material. The method comprises impregnating first layers of a reinforcement pack with a first resin material, combining the first layers with second layers of the reinforcement pack and impregnating the reinforcement pack with a second resin material which differs from the first resin material. Thus, a pultruded part may be formed having first layers with performance properties that differ from those of second layers of the pultruded part. Accordingly, the overall performance of a pultruded part may be more specifically tailored for its particular intended use.

In accordance with a first aspect of the present invention, a method is provided for performing resin injected pultrusion. The method comprises the steps of supplying at least one continuous first layer and at least one continuous second layer, impregnating the one first layer with a first resin material, combining the impregnated first layer with the second layer to form a pultrusion reinforcement pack, passing the reinforcement pack into an injection die and injecting a final resin material into the injection die to impregnate the reinforcement pack. The first and final resin materials are substantially nonidentical resins.

The step of supplying at least one second layer may comprise supplying at least two second layers, and the step of supplying at least one first layer may comprise supplying two first layers. Preferably, the step of supplying both the first and second layers comprises supplying layers of continuous filament mats, rovings or veils. Each first layer may comprise an interior pack layer and each second layer may comprise an exterior pack layer.

The step of impregnating the first layer preferably comprises the step of passing the first layer into an impregnation die and injecting the first resin material into the impregnation die. The step of impregnating the first layer may further comprise the step of impregnating the first layer with a second resin material prior to passing the pack into the injection die. Preferably, all of the first, second and final resin materials are substantially nonidentical. Alternatively, the step of impregnating at least one first layer comprises the steps of impregnating one first layer with a first resin material and another first layer with a second resin material.

The step of passing the reinforcement pack into an injection die comprises the steps of shaping and compressing the reinforcement pack before it is passed into the injection die.

The method further comprises the step of passing the impregnated pultrusion reinforcement pack to a curing die to cure the resin materials. Preferably, the curing die is sealingly coupled to the injection die and the impregnated reinforcement pack is maintained under compression as it is passed to the curing die.

In accordance with a second aspect of the present invention, a method is provided for performing resin injected pultrusion comprising the steps of supplying at least first and second continuous interior layers and at least first and second continuous exterior layers, impregnating the first interior layer with at least a first resin material, impregnating the second interior layer with at least a second resin material, combining the impregnated first and second interior layers with the first and second exterior layers to form a pultrusion reinforcement pack, passing the reinforcement pack into an injection die and injecting a final resin material into the injection die to impregnate the reinforcement pack. At least one of the first and second resin materials are substantially nonidentical to the final resin material.

The method further comprises the step of passing the impregnated pultrusion reinforcement pack to a curing die to cure the resin materials. Preferably, the curing die is sealingly coupled to the injection die and the impregnated reinforcement pack is maintained under compression as it is passed to the curing die.

In accordance with a third aspect of the present invention, a method is provided for performing resin injected pultrusion comprising the steps of providing first and second continuous reinforcement materials, impregnating the first continuous reinforcement material with a least one resin material and combining the impregnated first reinforcement material with the second reinforcement material which is unimpregnated with the one resin material to form a partially impregnated reinforcement pack.

Preferably, the first continuous reinforcement material comprises a plurality of first continuous layers of reinforcement material and the second continuous reinforcement material comprises a plurality of second continuous layers of reinforcement material. Also, the first layers may define interior layers of a partially impregnated reinforcement pack while the second layers define exterior layers of a partially impregnated reinforcement pack.

Accordingly, it is an object of the present invention to provide a method for performing resin injected pultrusion wherein multiple resins are applied to a reinforcement pack. It is further an object of the present invention to provide a method for performing resin injected pultrusion wherein at least one resin material is applied to first layers of a reinforcement pack and another resin material, nonidentical to the first resin material, is applied to the overall pack. It is another object of the present invention to provide a method for performing resin injected pultrusion wherein a first continuous reinforcement material is impregnated with a resin material then combined with a second unimpregnated reinforcement material. These, and other objects and advantages of the present invention will become apparent from the following detailed description, the accompanying drawings, and the appended claims.

DETAILED DESCRIPTION OF THE PREFERRED EMBODIMENTS

Figure 1:
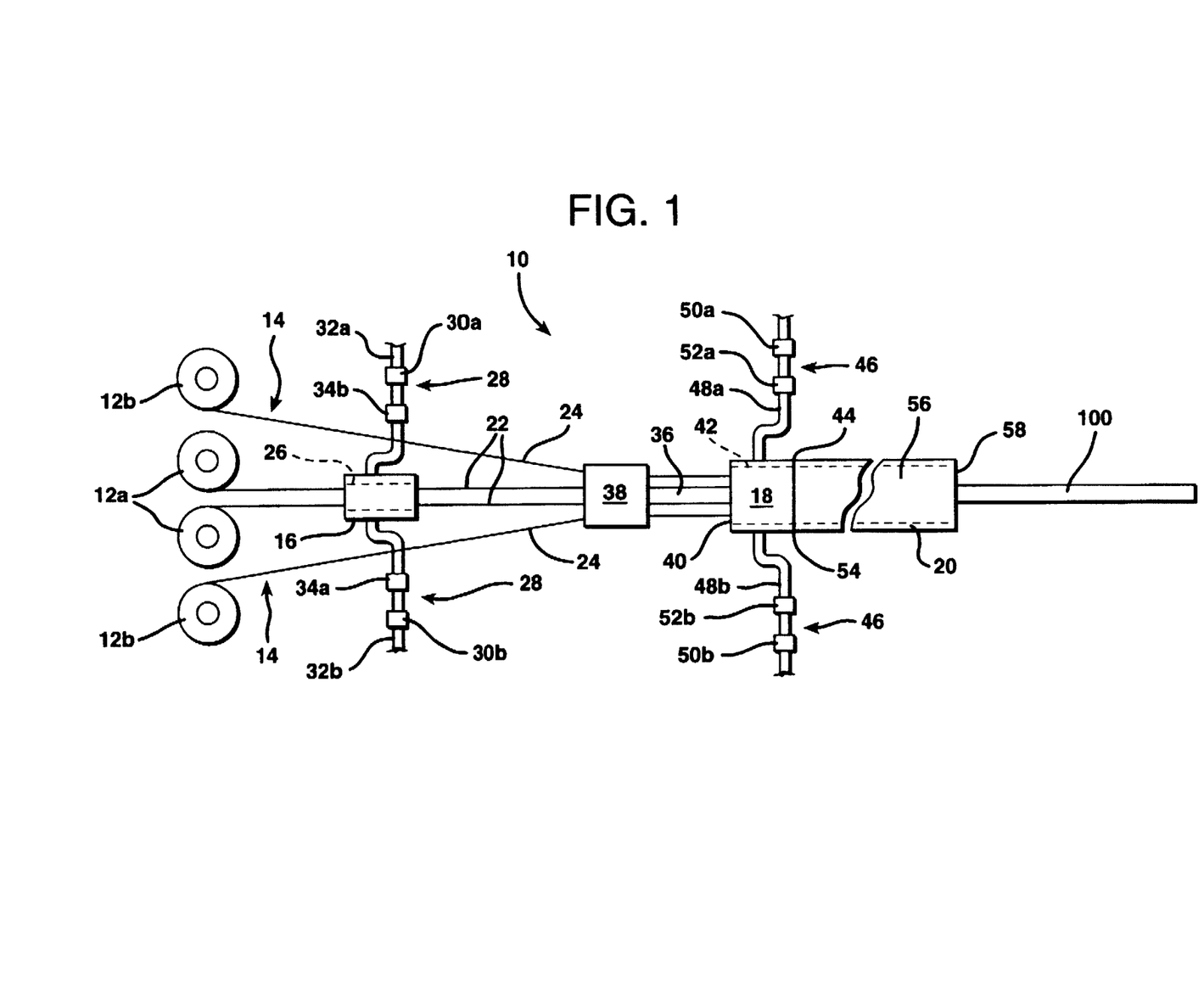
FIG. 1 is a schematic view of reinforcement material and apparatus utilized in practicing a method of the present invention wherein first layers of a reinforcement pack are passed through an impregnation die.

FIG. 1 shows schematically resin injected pultrusion apparatus 10 for forming a pultruded product 100. The apparatus 10 includes spools 12a and 12b having continuous reinforcement material 14 provided thereon, an impregnation die 16, a high pressure injection die 18 and a curing die 20. The continuous reinforcement material 14 comprises glass or polymer fibers, rovings or bundles of fibers, continuous filaments mats, fiber or polymer cloths, or veil. Spools 12a supply reinforcement material 14 to be used as interior layers 22 in a reinforcement pack 36 and spools 12b supply reinforcement material 14 to be used as exterior layers 24 in the reinforcement pack 36. While only four spools 12a and 12b are illustrated more or less may be provided as desired.

Interior layers 22 pass separately from the exterior layers 24 through an impregnation die 16. The interior layers 22 are impregnated with at least a first resin material in the die 16. Impregnation dies are well known in the art. One such die suitable in the present invention is disclosed U.S. Pat. 4,681,722, the disclosure of which is herein incorporated by reference.

Impregnation die 16 includes a passageway 26 extending completely therethrough. Resin supply apparatus 28 communicates with the die 16 and supplies at least a first resin material under substantially constant pressure to the passageway 26. Supply apparatus 28, in the illustrated embodiment, includes supply devices 30a and 30b and supply lines 32a and 32b. Supply devices 30a and 30b may include any number of conventional constant pressure pumps such as a double-action piston pump, a constant pressure pot, or a multi-component mixing chamber for in-line mixing of at least one uncatalyzed component and at least one catalyzed component of a multi-component resin material just prior to injection into the impregnation die 16.

Supply apparatus 28 further includes conventional heaters 34a and 34b which serve to heat the resin material to lower its viscosity prior to it being injected into the impregnation die 16. As shown in FIG. 1, heaters 34a and 34b are located between supply devices 30a and 30b and the impregnation die 16.

Figure 3:
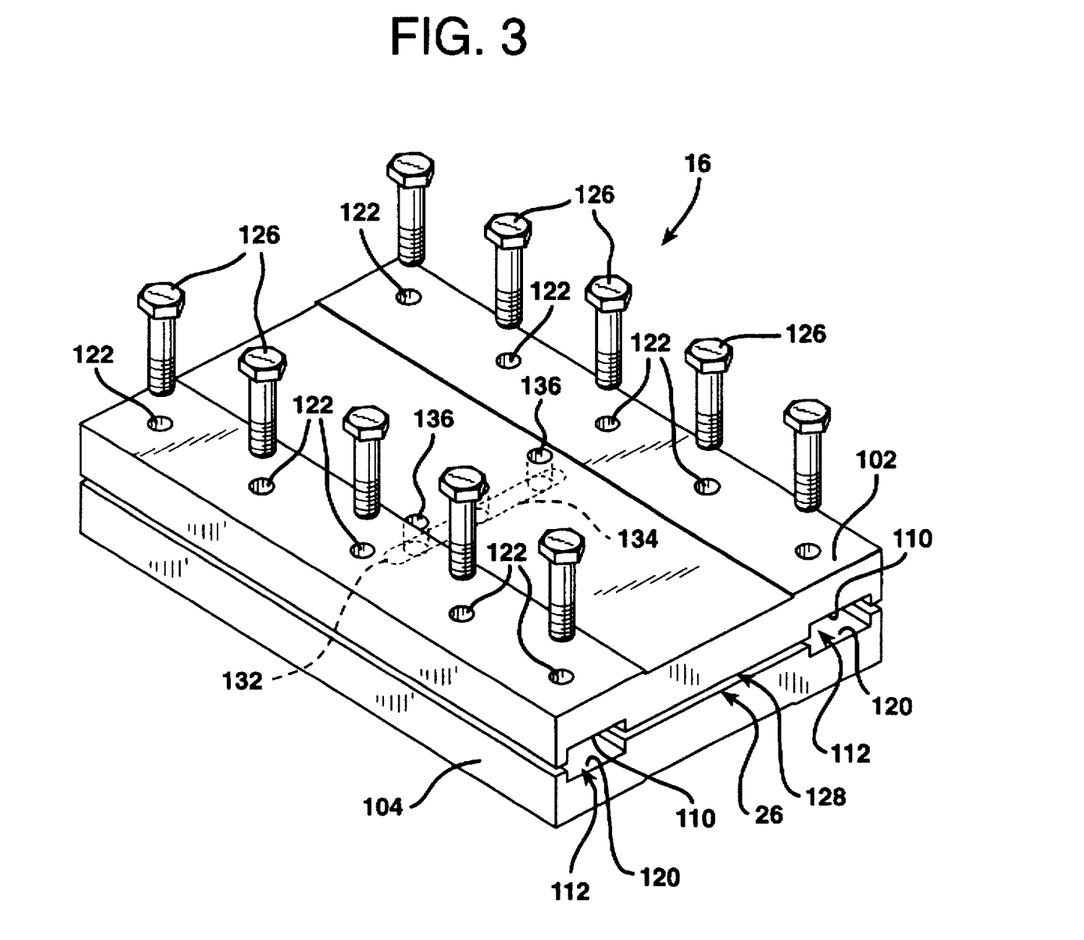
FIG. 3 is a perspective view of an impregnation die constructed in accordance with the present invention.
Figure 4:
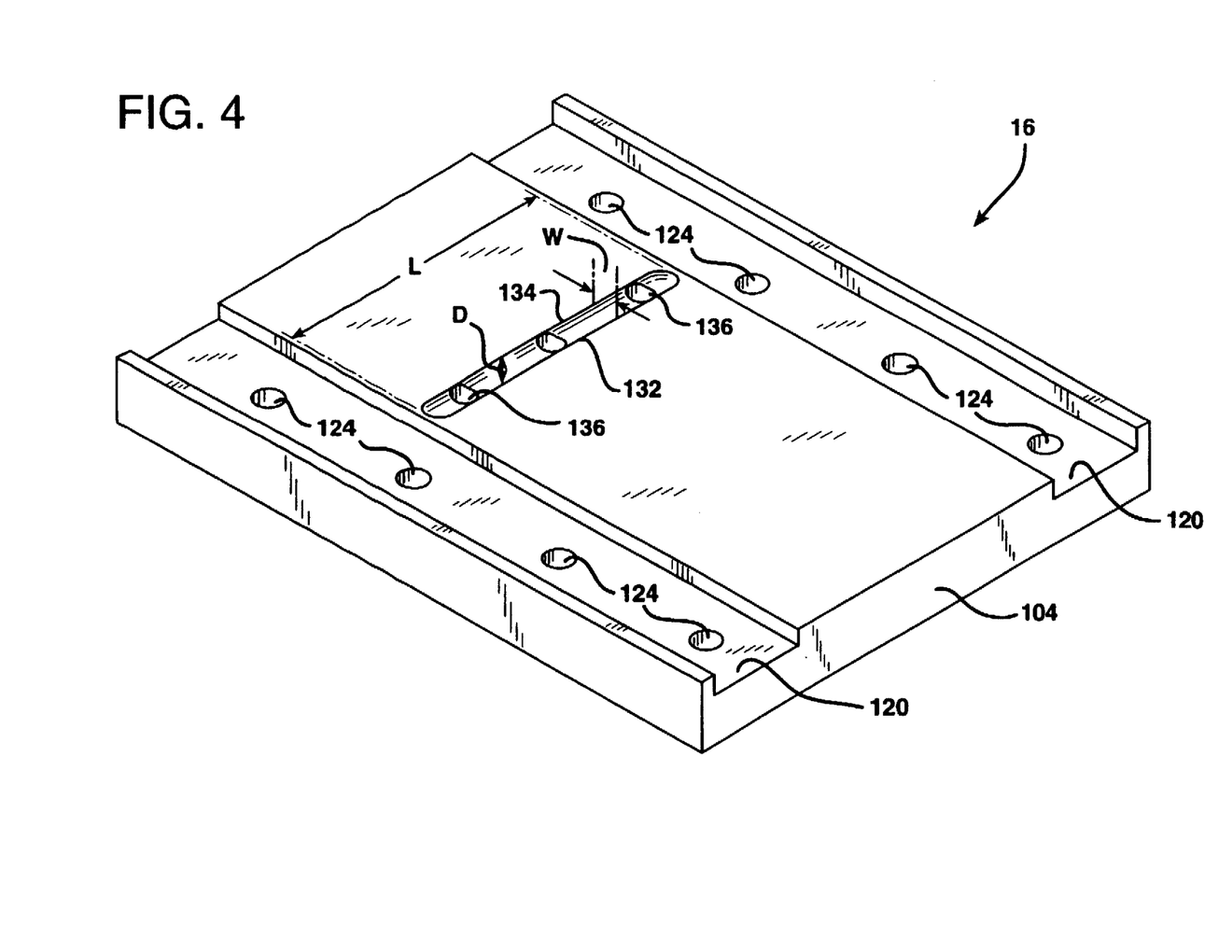
FIG. 4 is a perspective view of a die body of the impregnation die of FIG. 3.

A particularly preferred impregnation die 16 is illustrated in FIGS. 3 and 4. The impregnation die 16 comprises a first die body 102 and a second die body 104, both of which may be formed from a metal or other appropriate material. The first die body 102 has two inner recesses 110 which are positioned opposite to two inner recesses 120 provided in the second die body 104. The inner recesses 110 and 120 define shim rail receiving channels 112. Shim rails (not shown) are placed in the receiving channels 112 and define the width and thickness of the passageway 26.

The first die body 102 and the second die body 104 are coupled to one another. A plurality of apertures 122 extend through the first die body 102 and a plurality of apertures 124 extend through the second die body 104. The shim rails are provided with openings that are spaced and sized to correspond with apertures 122 and 124. Bolts 126 pass through the apertures 122 in the first die body 102, through the openings in the shim rails and threadedly engage the apertures 124 in the second die body 104.

Interior layers 22 pass into impregnation die 16 through an entry portion 128 of the inner passageway 26. The passageway 26, in the illustrated embodiment, is not tapered and is sized to correspond to the dimensions of the interior layers 22 when not compressed. A tapered passageway and compression of the interior layers 22 may be provided if desired.

The interior layers 22 traveling through the passageway 26 pass by a weir 132. Resin material is injected into the weir 132 to impregnate the interior layers 22. The weir 132 comprises a channel or recess 134 formed, in the illustrated embodiment, in the second die body 104. Alternatively, the weir 132 may be formed in the first die body 102 or in both of the first and second die bodies 102 and 104. Channel 134 is positioned substantially perpendicular to the direction of travel of the interior layers 22 through the passageway 26. Preferably, the channel 134 has a depth D equal to about ½ inch, a width of W equal to about ½ inch and a length L which will vary depending upon the width of the interior layers 22.

Resin material is injected into the weir 132 through injection ports 136 which communicate with the resin supply apparatus 28. Preferably, the injection pressure of the resin material ranges from about 5 to about 15 pounds per square inch (psi). Of course, one of ordinary skill in the art will recognize that the injection pressure will vary depending upon the thickness and density of the interior layers 22 as well as the viscosity of the chosen resin material.

Returning to FIG. 1, once impregnated, the interior layers 22 are combined with the exterior layers 24 to form the reinforcement pack 36. A conventional shaping die 38 is provided for combining the interior layers 22 and exterior layers 24 to form the reinforcement pack 36. In addition, shaping die 38 properly aligns the layers relative to one another and compresses the layers 22 and 24 to an appropriate thickness.

Still referring to FIG. 1, after the reinforcement pack 36 exits the shaping die 38, it passes into the injection die 18. The injection die 18 may comprise an injection die such as disclosed in U.S. Pat. No. 5,073,413 to Koppernaes et al. or U.S. Pat. No. 3,556,888 to Goldsworthy, the disclosures of which are herein incorporated by reference. However, particularly preferred is the injection die disclosed in U.S. patent application Ser. No. 08/476,812, (Docket No. 23728A), entitled "Methods and Apparatus For Resin Impregnated Pultrusion," filed Jun. 7, 1995 by Gauchel et al. and assigned to the same assignee as the present invention, the disclosure of which is herein incorporated by reference.

Injection die 18 generally comprises an entry portion 40, an internal passageway 42 and an exit portion 44. Reinforcement pack 36 enters the die 18 through the entry portion 40. Conventional pulling means (not shown) is provided downstream from the curing die 20 for pulling the reinforcement materials from the spools 12a and 12b and through the dies 16, 38, 18 and 20. As the reinforcement pack 36 is pulled through the passageway 42, the pack 36 is compressed and impregnated with a final resin material.

Injection die 18 includes resin supply apparatus 46 for supplying the final resin material to the injection die 18. Supply apparatus 46 comprises supply lines 48a and 48b, supply devices 50a and 50b and heaters 52a and 52b. The supply devices 50a and 50b may comprise any of the devices discussed above that may be used as supply devices 30a and 30b. Final resin material may be either a single resin composition injected into the die 18 through one or more injection ports (not shown) or may comprise different multiple resin materials injected into different injection ports (not shown) in the injection die 18.

Injection die 18 is preferably sealingly coupled or integrally formed with the curing die 20. Thus, as the reinforcement pack 36 leaves the injection die 18 through the exit portion 44, it directly enters the curing die 20 without being exposed to the surrounding environment. Further, the pack 36 is constantly maintained under pressure as it moves from the injection 18 into the curing die 20.

Curing die 20 includes an entry 54, a central passage 56 and an exit 58. Curing die 20 may comprise a curing die such as described in the above-referenced U.S. patent application entitled "Methods and Apparatus For Resin Impregnated Pultrusion" (Docket No 23728A), which has been previously incorporated herein by reference. The curing die 20 acts to shape pack 36 to its final intended shape and to cure the resin materials to form the final pultruded product 100.

As described, at least a first resin material is injected into the impregnation die 16 while a final resin material is injected into the injection die 18. The first resin material and the final resin material are substantially nonidentical or different resin materials. In other words, the first and final resin materials are not identical or the same. Indeed, by employing nonidentical resin materials, different properties may be imparted to the interior layers 22 and the exterior layers 24.

This aspect of the present invention may be advantageously employed in several applications. For example, a pultruded part intended for use as, a motor vehicle bumper beam may include interior layers impregnated with a strength imparting resin while the outer layers are impregnated with a flexibility imparting resin so that those layers are capable of absorbing high quantities of energy resulting from an impact. Also, a pultruded part intended for use as a chemical mixing blade may be impregnated with a final resin material which comprises a chemical resistance imparting resin and the interior layers may be impregnated with a strength imparting resin.

Preferably, the final resin material is applied before the first resin material has had sufficient time to substantially cure. This allows the first and final resin materials to combine or mix at the adjacent interior and exterior layers. Thus, a portion of the first resin material migrates into one or more of the exterior layers 24 while a portion of the final resin material migrates into one or more of the interior layers 22. This migration of resin materials reduces the likelihood of the formation of voids or zones of little or no resin material at the interface between the exterior layers 24 and the interior layers 22. Voids or zones of little or no resin material tend to weaken the product 100 and decrease its overall performance. In addition, impregnation of the pack 36 with the final resin material prior to the first resin material fully curing results in superior bonding of adjacent or interface interior and exterior layers 22 and 24. This superior bonding results because the different resin materials are allowed to mix with one another in the adjacent interior and exterior layers 22 and 24. However, if the first resin material has substantially cured before application of the final resin material, there is a risk that the bond between the adjacent interior and exterior layers will be somewhat less than desirable. This may occur since the resin materials are incapable of mixing to any extent in those adjacent layers.

Figure 2:
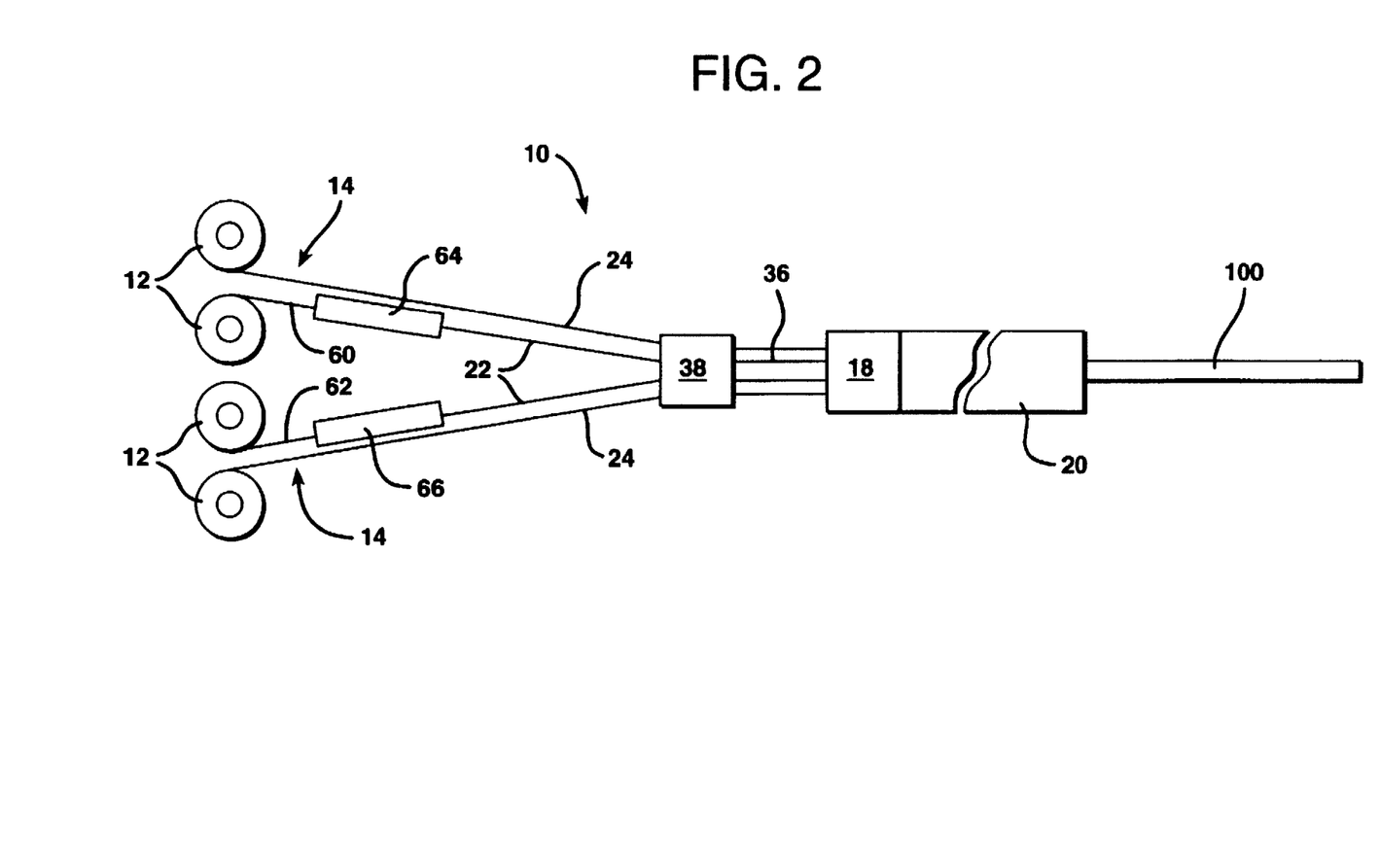
FIG. 2 is a schematic view of reinforcement material and apparatus utilized in practicing a method of the present invention wherein first layers of a reinforcement pack are divided and passed through at least two separate impregnation dies.

Multiple resin materials may be applied to different sets of layers within a reinforcement pack to impart differing properties across the final product. Turning now to FIG. 2, there is seen an additional embodiment of the present invention. Spools 12 having reinforcement materials 14, as described above, are provided. The reinforcement materials 14 pass through a shaping die 38 to form a pack 36, pass into an injection die 18 where a final resin material is injected and, finally, pass through a curing die 20, where the resin material is allowed to cure, all as described above.

A first interior layer 60 passes through a first impregnation die 64 and a second interior layer 62 passes through a second impregnation die 66. The impregnation dies 64 and 66 are substantially the same as the impregnation die 16 discussed above. The resin materials injected into the injection dies 64 and 66 may be the same or different. Thus, the first interior layer 64 may be impregnated with a first resin material and the second interior layer 66 may be impregnated with a second resin material which differs from the first resin material. At least one or both of the first and second resin materials is substantially nonidentical to the final resin material injected into the injection die 18.

Of course one of ordinary skill in the art will recognize that when the interior layers 22 are divided into separate sub-layers, each to be separately preimpregnated, an equivalent number of impregnation dies will be required. Thus, three interior layers to be separately preimpregnated will require three impregnation dies and so forth. In addition, resin materials of either the same or differing compositions will also be provided to the impregnation dies as described above. Further, if so desired, multiple impregnation dies may be provided in series. For instance, an interior layer may be impregnated in a first die with a first resin material then in a second die (not shown) located downstream from the first die with a different resin material.

Having described the invention in detail and by reference to preferred embodiments thereof, it will be apparent that modifications and variations are possible without departing from the scope of the invention which is defined in the appended claims.

We claim:

1. A method for performing resin injected pultrusion comprising the steps of:
   supplying at least one continuous first interior layer and at least one continuous second exterior layer;
   impregnating said at least one first interior layer with at least a first strength imparting resin material;
   combining said impregnated first interior layer and said at least one second exterior layer to form a pultrusion reinforcement pack;
   passing said reinforcement pack into an injection die; and,
   injecting a final resin material into said injection die to impregnate said reinforcement pack with the final resin material to form an impregnated pultrusion reinforcement pack, wherein said first and final resin materials are substantially nonidentical resin materials.

2. A method as set forth in claim 1, wherein said final resin material is a flexibility imparting resin.

3. A method as set forth in claim 1, wherein said final resin material is a chemical resistant resin.

4. A method for performing resin impregnated pultrusion comprising the steps of:
   supplying at least first and second continuous interior layers and at least first and second continuous exterior layers for forming a pultrusion reinforcement pack;
   impregnating said first interior layer with at least a first resin material;
   impregnating said second interior layer with at least a second resin material which differs from said first resin material;
   combining said impregnated first and second interior layers and said first and second exterior layers to form a reinforcement pack;
   passing said reinforcement pact into an injection die; and,
   injecting a final resin material into said injection die to impregnate said reinforcement pack with said final resin material to form an impregnated pultrusion reinforcement pack, wherein said at least one of said first and second resin materials are substantially nonidentical to said final resin material.

5. A method for performing resin injected pultrusion as claimed in claim 4, wherein said step of supplying said interior and exterior layers comprises the step of supplying layers selected from the group consisting of continuous filaments mats, rovings and veils.

6. A method for performing resin injected pultrusion as claimed in claim 4, wherein all of said first, second and final resin materials are substantially nonidentical.

7. A method for performing resin injected pultrusion as claimed in claim 4, further comprising the step of passing said impregnated pultrusion reinforcement pack to a curing die to cure the resin materials in said impregnated pultrusion reinforcement pack.

8. A method for performing resin injected pultrusion as claimed in claim 7, wherein said curing die is sealingly coupled to said injection die and said impregnated reinforcement pack is maintained under compression as it is passed to said curing die.

9. A method for performing resin injected pultrusion comprising the steps of:
   supplying at least one continuous first interior layer and at least one continuous second exterior layer;
   impregnating said at least one first interior layer with at least a first resin material comprising a strength imparting resin by passing said first interior layer into an impregnation die and injecting said at least one first resin material into said impregnation die;
   combining said impregnated first interior layer and said at least one second exterior layer to form a pultrusion reinforcement pack;
   passing said reinforcement pack into an injection die; and,
   injecting a final resin material comprising a flexibility imparting resin into said injection die to impregnate said reinforcement pack with the final resin material to form an impregnated pultrusion reinforcement pack, wherein said first and final resin materials are substantially nonidentical resin materials.

10. A method for performing resin injected pultrusion as claimed in claim 9, wherein the step of supplying at least one second exterior layer comprises the step of supplying at least two second layers.

11. A method for performing resin injected pultrusion as claimed in claim 9, wherein the step of supplying at least one first interior layer comprises the step of supplying at least two first interior layers.

12. A method for performing resin injected pultrusion as claimed in claim 11, wherein said impregnating step comprises impregnating one of said first layers with said first resin material and impregnating the other of said first layers with a second resin material.

13. A method for performing resin injected pultrusion as claimed in claim 9, wherein said step of supplying said first and second layers comprises the step of supplying layers selected from the group consisting of continuous filaments mats, rovings and veils.

14. A method for performing resin injected pultrusion as claimed in claim 9, further comprising the step of impregnating said impregnated first layer with at least a second resin material prior to passing said pack into said injection die.

15. A method for performing resin injected pultrusion as claimed in claim 14, wherein all of said first, second and final resin materials are substantially nonidentical.

16. A method for performing resin injected pultrusion as claimed in claim 9, wherein said step of passing said reinforcement pack into an injection die comprises the steps of shaping and compressing said reinforcement pack.

17. A method for performing resin injected pultrusion as claimed in claim 9, further comprising the step of passing said impregnated pultrusion reinforcement pack to a curing die to cure the resin materials in said impregnated pultrusion reinforcement pack.

18. A method for performing resin injected pultrusion as claimed in claim 17, wherein said curing die is sealingly coupled to said injection die and said impregnated reinforcement pack is maintained under compression as it is passed to said curing die.

19. A method for performing resin injected pultrusion comprising the steps of:

supplying at least one continuous first interior layer and at least one continuous second exterior layer;

impregnating said at least one first interior layer with at least a first resin material comprising a strength imparting resin by passing said first interior layer into an impregnation die and injecting said at least one first resin material into said impregnation die;

combining said impregnated first interior layer and said at least one second exterior layer to form a pultrusion reinforcement pack;

passing, said reinforcement pack into an injection die; and injecting a final resin material comprising a chemical resistant resin into said injection die to impregnate said reinforcement pack with the final resin material to form an impregnated pultrusion reinforcement pack, wherein said first and final resin materials are substantially nonidentical resin materials.

* * * * *

UNITED STATES PATENT AND TRADEMARK OFFICE
CERTIFICATE OF CORRECTION

PATENT NO. : 5,783,013

DATED : July 21, 1998

INVENTOR(S): Beckman, et al.

It is certified that error appears in the above-identified patent and that said Letters Patent is hereby corrected as shown below:

Column 8

Claim 13, line 40 - 41 should read :

claimed in claim 9, wherein said step of supplying said interior and exterior layers comprises.

Signed and Sealed this

Fourth Day of May, 1999

Attest:

Q. TODD DICKINSON

Attesting Officer

Acting Commissioner of Patents and Trademarks